United States Patent
Huang et al.

(10) Patent No.: US 8,995,712 B2
(45) Date of Patent: Mar. 31, 2015

(54) METHOD FOR AUTOMATIC DETECTION AND TRACKING OF MULTIPLE TARGETS WITH MULTIPLE CAMERAS AND SYSTEM THEREFOR

(75) Inventors: Ching-Chun Huang, Taichung (TW); Sheng-Jyh Wang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 1354 days.

(21) Appl. No.: 12/481,910

(22) Filed: Jun. 10, 2009

(65) Prior Publication Data

US 2010/0166260 A1    Jul. 1, 2010

(51) Int. Cl.
G06K 9/00    (2006.01)
G06K 9/32    (2006.01)
G06K 9/20    (2006.01)

(52) U.S. Cl.
CPC .......... G06K 9/3241 (2013.01); G06K 9/00771 (2013.01); G06K 9/2054 (2013.01)
USPC ............... 382/103; 382/226; 348/42; 348/47; 348/48; 348/135; 348/142; 348/143; 348/153; 348/159; 348/169; 348/170; 348/171; 348/172

(58) Field of Classification Search
USPC ........ 382/103, 226; 348/42, 47, 48, 135, 142, 348/143, 153, 159, 169–172
See application file for complete search history.

(56) References Cited

U.S. PATENT DOCUMENTS

| | | | |
|---|---|---|---|
| 6,950,123 B2 | 9/2005 | Martins | |
| 7,151,843 B2 * | 12/2006 | Rui et al. | 382/103 |
| 7,929,730 B2 * | 4/2011 | Huang et al. | 382/103 |
| 8,059,864 B2 * | 11/2011 | Huang et al. | 382/103 |
| 2003/0123703 A1 | 7/2003 | Pavlidis et al. | |
| 2004/0156530 A1 * | 8/2004 | Brodsky et al. | 382/103 |
| 2006/0285723 A1 | 12/2006 | Morellas et al. | |

(Continued)

FOREIGN PATENT DOCUMENTS

WO    WO 2008020663 A1 *    2/2008    ............ G06K 9/00

OTHER PUBLICATIONS

V. Kettnaker and R. Zabih. "Bayesian Multi-Camera Surveillance", Proceedings of Computer Vision and Pattern Recognition, 1999 vol. II: pp. 253-259.*

(Continued)

*Primary Examiner* — Matthew Bella
*Assistant Examiner* — Julian Brooks
(74) *Attorney, Agent, or Firm* — Bui Garcia-Zamor; Jessica H. Bui, Esq.

(57) ABSTRACT

A method for automatically detecting and tracking multiple targets in a multi-camera surveillance zone and system thereof. In each camera view of the system only a simple object detection algorithm is needed. The detection results from multiple cameras are fused into a posterior distribution, named TDP, based on the Bayesian rule. This TDP distribution represents a likelihood of presence of some moving targets on the ground plane. To properly handle the tracking of multiple moving targets with time, a sample-based framework which combines Markov Chain Monte Carlo (MCMC), Sequential Monte Carlo (SMC), and Mean-Shift Clustering, is provided. The detection and tracking accuracy is evaluated by both synthesized videos and real videos. The experimental results show that this method and system can accurately track a varying number of targets.

5 Claims, 12 Drawing Sheets
(11 of 12 Drawing Sheet(s) Filed in Color)

(56) References Cited

U.S. PATENT DOCUMENTS

| | | | |
|---|---|---|---|
| 2007/0064107 A1* | 3/2007 | Aggarwal et al. | 348/143 |
| 2007/0127774 A1 | 6/2007 | Zhang et al. | |
| 2008/0031492 A1* | 2/2008 | Lanz | 382/103 |
| 2009/0110236 A1* | 4/2009 | Huang et al. | 382/103 |

OTHER PUBLICATIONS

T. Zhao and R. Nevatia, "Bayesian Human Segmentation in Crowded Situations", Proc. IEEE Conf. on Computer Vision and Pattern Recognition,2003 vol. 2: pp. 12-19.*

Huang et al., "A Monte Carlo Based Framework for Multi-Target Detection and Tracking Over Multi-Camera Surveillance System". Workshop on Multi-camera and Multi-modal Sensor Fusion Algorithms and Applications—M2SFA2 2008, Marseille:France Oct. 6, 2008. pp. 1-12.*

Workshop on Multi-camera and Multi-modal Sensor Fusion Algorithms and Applications ($M^2SFA^2$), Oct. 18, 2008, Marseille, France, 29 pages.

A.Utsumi, H.Mori, J. Ohya, and M.Yachida, "Multiple-Human Tracking using Multiple Cameras", Third IEEE International Conference on Automatic Face and Gesture Recognition, Apr. 1998.

A.Mittal and L.Davis, "Unified Multi-camera Detection and Tracking Using Region-Matching," in Proceedings of IEEE Workshop on Multi-Object Tracking, pp. 3-10, Vancouver, BC, Canada, Jul. 2001.

A.Mittal and L.Davis, "M2Tracker: A Multi-View Approach to Segmenting and Tracking People in a Cluttered Scene Using Region-Based Stereo", International Journal of Computer Vision, vol. 51, No. 3, pp. 18-33, 2002.

Weiming Hu, Min Hu, Xue Xhou, Tieniu Tan, Jianguang Lou, and Steve Maybank, "Principal Axis-Based Correspondence between Multiple Cameras for People Tracking," IEEE Transactions on Pattern Analysis and Machine Intelligence, vol. 28, No. 4, pp. 663-671, 2006.

S.Khan, O.Javed, and M.Shah, "Tracking in Uncalibrated Cameras with Overlapping Field of View", Proc. Performance Evaluation of Tracking and Surveillance PETS 2001, Dec. 2001.

Francois Fleuret, Richard Lengagne, Pascal Fua, "Fixed Point Probability Field for Complex Occlusion Handling", IEEE International. Conference on Computer Vision, 2005.

F.Fleuret, J.Berclaz, R.Lengagne and P.Fua, "Multi-Camera People Tracking with a Probabilistic Occupancy Map," IEEE Transactions on Pattern Analysis and Machine Intelligence, vol. 30, Issue. 2, Feb. 2008.

C.Andrieu, N.de Freitas, A.Doucet, and M.I.Jordan, "An Introduction to MCMC for Machine Learning," Machine Learning, vol. 50, pp. 5-43, 2003.

M. Sanjeev Arulampalam, Simon Maskell, Neil Gordon, and Tim Clapp, "A Tutorial on Particle Filters for Online Nonlinear/Non-Gaussian Bayesian Tracking," IEEE Transaction on Signal Processing, vol. 50, No. 2, pp. 174-188, 2002.

T.Kailath, "The Divergence and Bhattacharyya Distance Measures in Signal Selection," IEEE Transaction Commun. Tech., vol. 15, No. 1, pp. 52-60, 1967.

B.Georgescu, I. Shimshoni, P.Meer, "Mean Shift Based Clustering in High Dimensions: A texture Classification Example," IEEE International. Conference on Computer Vision, 2003.

D. Comaniciu and P. Meer, "Mean Shift: A Robust Approach Toward Feature Space Analysis," IEEE Transactions on Patterns Analysis and Machine Intelligence, vol. 24, No. 5, pp. 603-619, May 2002.

G. Taylor, A. Chosak and P. Brewer, "OVVV: Using Virtual Worlds to Design and Evaluate Surveillance Systems", Jan. 4244-1180-7/07/ $25.00 © 2007 IEEE.

* cited by examiner

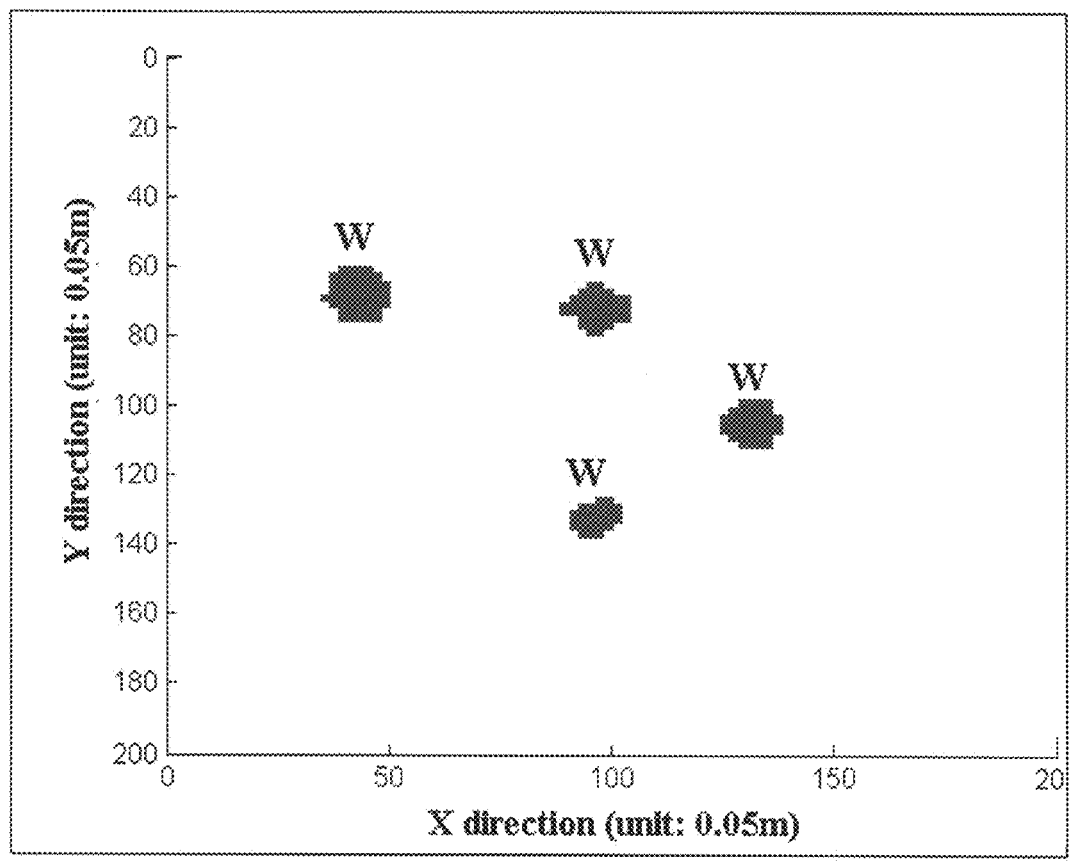

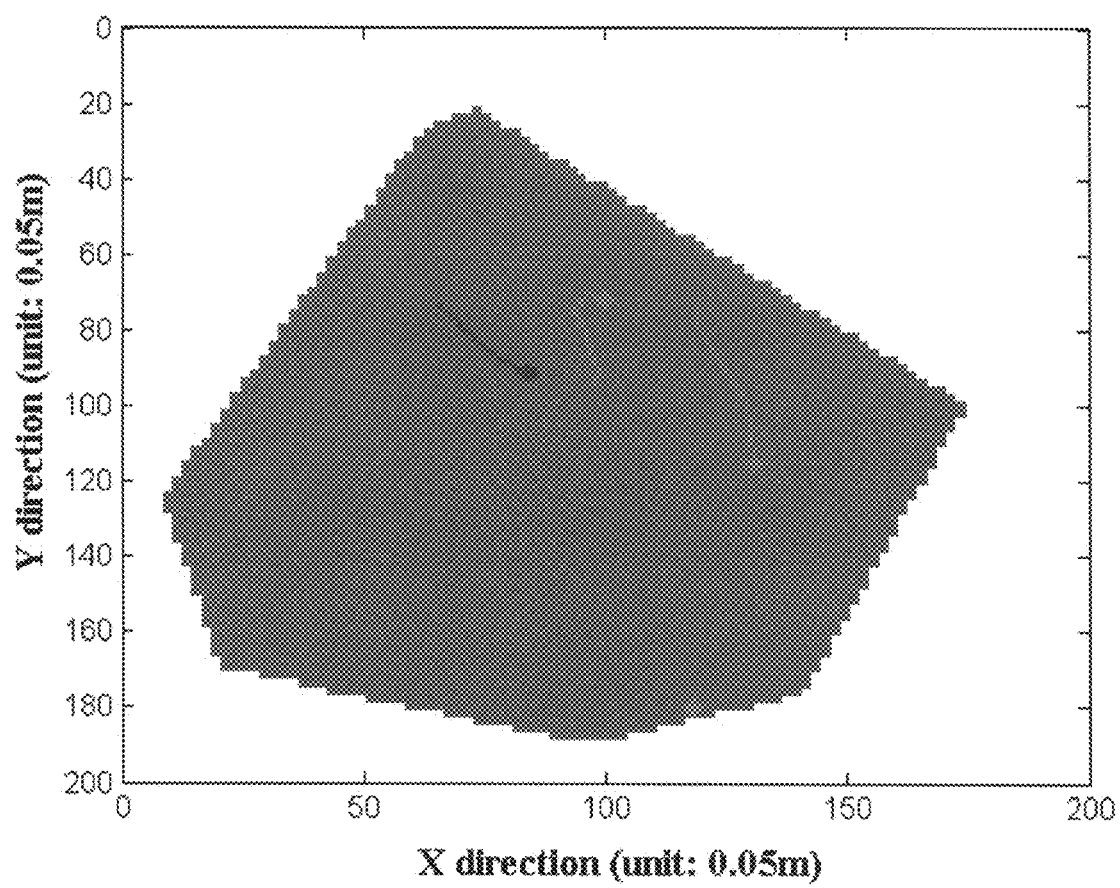

METHOD FOR AUTOMATIC DETECTION AND TRACKING OF MULTIPLE TARGETS WITH MULTIPLE CAMERAS AND SYSTEM THEREFOR

CROSS-REFERENCE TO RELATED APPLICATION

This application claims all benefits accruing under 35 U.S.C. §119 from Taiwanese Patent Application No. 097150635, filed on Dec. 25, 2008 in the Intellectual Property Office Ministry of Economic Affairs, Republic of China, the disclosure of which is incorporated by reference herein.

FIELD OF THE INVENTION

The present invention relates to a multi-target detecting and tracking method and system, and more particularly to a multi-target detecting and tracking method with multiple cameras and system therefore.

BACKGROUND OF THE INVENTION

A constantly increasing demand for safety and security adds weight to the development of security surveillance systems provided with multiple cameras. However, the multi-camera surveillance system still takes a lot of human force to execute a real-time surveillance task. Since it is hard for the security personnel on visual surveillance to coordinate multiple cameras, after working for hours, the surveillance personnel's concentration lapses into distraction. Consequently, attempts have been made to group images monitored by multiple cameras into a panorama view in a mapping way, thereby enhancing a supervisor's monitoring efficiency and alleviating his workload. Such a method using the mapping technique to indicate the mapping relationship among planes inside two spaces is termed as homography mapping. However, image contents possibly contain a multitude of different planes, e.g. ground plane and vertical wall. In that sense, two images inadequately mapped with the homography mapping will give rise to the corresponding error.

Besides, there is also a proposal to actively alert a supervisor of noteworthy events desirably by means of the image analysis result. Such method directly analyzes images obtained by a single camera which carries out complex target detecting and tracking in the image domain. After completing the operation of a single-camera image analyzing unit, a common target mapping relationship is then determined among multiple cameras, so as to establish the information integration of the multiple cameras. As the method directly analyzes in the image domain, it will be influenced by various uncertain factors, such as varying light source, multi-object mutual occlusions and surrounding light and shadow, which are prone to generating a lot of false alarms.

To more definitely disclose the difference between the present invention and prior art, conventional systems most similar to the present invention are hereby depicted as follows.

U.S. Pat. No. 6,950,123B2 issued on Sep. 27, 2005 (hereinafter called document 1) discloses: (a) the system first initializes the processing of player tracking using an initialization component including manual target selection, region of interesting (ROI) definition, and camera calibration through the homography mapping wherein the manual target selection gives the system initial positions of targets to be tracked. The ROI defines a closed structured environment such as a soccer field. The homography mapping indicates the relationships between 2D camera views and 3D world plane; (b) the object detection and tracking are executed in each 2D camera view. These processes are accomplished by a motion detection module, a connective component module, and many 2D object trackers for different targets; and (c) different object locations are back-projected to 3D world plane for final data fusion.

Nevertheless, the differences between document 1 and the present invention are as follows: (a) document 1 needs to manually select target to be tracked while the present invention could automatically detect and track target (explained later); (b) document 1 adopts the homography mapping which is only suitable for long-distance monitoring, but not for a general surveillance zone, while the present invention is applicable to the general 3D-to-2D projection matrix, which is more suitable for general cases (explained later); (c) document 1 restricts the surveillance zone to a closed structured environment (e.g. soccer field), while the present invention is free from the constraint (explained later); and (d) in addition to the fact that document 1 directly solves the complicated tracking and corresponding problems in the 2D image and thus inevitably faces various challenges such as lighting variance, multi-object mutual occlusions and shadows effects, the way this method adopts is also different from that adopted by the present invention.

Moreover, US Patent No. 2006/0285723 A1 published on Dec. 21, 2006 (hereinafter called document 2) is a method for tracking the targets distributed across an area having a network of cameras, which discloses the following steps: (a) before the system starts operating, the topological proximity model of the camera network is built first through a training process; at beginning, user manually selects objects for tracking in the first camera view; (b) the system generates target models of interested objects; the target model includes color features, shape features, and texture feature; (c) the system executes background subtraction (motion detection) and particle tracking (object tracking) in the 2D camera view; (d) if a target moves out of the current camera view, the system transfers the target model to neighbor cameras for continuously tracking the leaving target by judging in accordance with the topological proximity model.

The aforementioned document 2 is different from the present invention in that: (a) document 2 needs to manually select tracking targets, while the present invention could automatically detect and track the target; (b) document 2 directly solves the complicated tracking and corresponding problems in the 2D image domains. This is not the approach of the present invention.

Furthermore, US2007/0127774 A1 published on Jun. 7, 2007 (hereinafter called document 3) relates to a target detecting and tracking system from video streams, and document 3 is characterized in: (a) detecting moving pixels in the video and grouping moving pixels into motion blocks; (b) automatically identifying targets based on the motion blocks; (c) tracking and managing the tracked targets in the video. Document 3 is different from the present invention in that: (a) document 3 directly solves the complicated tracking and corresponding problems in the 2D image domains; this is not the approach of the present invention (explained later); (b) document 3 focuses on the single-camera processing.

US Patent No. 2003/0123703 A1 published on Jul. 3, 2003 (hereinafter called document 4) discloses that: (a) this system requires the user to define a search area or surveillance zone, wherein several imaging devices are placed to monitor the search area, and neighboring camera views are overlapped; (b) the homography mapping matrices are decided by referring to the multiple landmark points in the world plane; all camera views are fused to universal images having a global coordination system; (c) this system executes background subtraction (motion detection) and object tracking in the fused universal images.

Document 4 is different from the present invention in that: (a) document 4 adopts the homography mapping which is only suitable for long-distance monitoring. Our method uses the general 3D-to-2D projection matrix which is more suitable for general cases; (b) document 4 solves the detection and tracking problems in the fused universal image; however, the universal image is constituted by warping multiple camera views into a global plane through the homography mapping; it does not completely represent the 3D depth information.

In view of the foregoing drawback of the prior arts, the present invention hereby provides a method and system of multi-target detecting and tracking with multiple cameras so that the result obtained from the analysis in each respective image domain of multiple single cameras is integrated into the 3D time domain, thereby facilitating detecting and tracking of multiple moving targets in the spatial domain and further helping monitoring personnel to efficiently manage the multi-camera surveillance system.

SUMMARY OF THE INVENTION

In accordance with a first aspect of the present invention, a system and method of multi-target detecting and tracking with multiple cameras is provided. The analysis of the system and method in the 2D image domain only needs to perform simple detection analysis (e.g. background subtraction) of moving object, thereby achieving a stable and precise result.

In accordance with a second aspect of the present invention, an efficient information integration technique is provided. The technique integrates detection results of moving objects from multiple cameras in the respective image field to a posterior distribution representing a likelihood of having a moving object at different locations of the ground plane so as to effectively integrate multi-camera information.

In accordance with a third aspect of the present invention, a system capable of simultaneously accomplishing detecting and tracking of multiple moving objects is provided. This system converts detecting and tracking of moving objects into a probability sampling management process in the 3D space domain, so that the system detects multiple objects newly entering the scene at any time and assigns a unique ID for continuous tracking until the objects leave the surveillance zone.

In accordance with a fourth aspect of the present invention, a method of multi-target detecting and tracking with multiple cameras is provided. The operating speed of the method meets the requirement of a practical application system.

To achieve the foregoing aspects, the method of the present invention of multi-target detecting and tracking with multiple cameras includes the steps as follows: (a) analyzing a detection result of a plurality of camera views with a target detection algorithm in generating a plurality of analysis data; (b) integrating the analysis data with a Baysian framework to create a target detection probability (TDP) distribution; and (c) simultaneously and automatically detecting and tracking a plurality of moving targets in the camera views.

Preferably, the target detection algorithm is applied to a 2D background subtraction between any one of the camera views and a background thereof.

Preferably, the system is applicable to an IP camera, a digital recorder, a video surveillance system, an interface software between man and machine, a communication electronic device (e.g. 3G mobile phone), a traffic control system and a security system.

Preferably, the TDP distribution in the step (b) equals to a sum of a probability, $G_1(X)$, making a newly appearing target to be detected easily and a probability, $G_2(X)$, providing temporal information in the time domain between successive frames, and X is a location on a ground plane.

Preferably, the step (c) is a sample management process, further including the steps as follows: (c-1) sample generating step executing a MCMC sampling corresponding to the probability $G_1(X)$ and generating a plurality of samples from the TDP distribution and executing a SMC sampling corresponding to the probability $G_2(X)$ to iteratively update and predict each location, weight and ID of the samples; (c-2) sample labeling step adopting a maximum likelihood decision rule to classify the samples; (c-3) new target identifying step grouping similar samples with a mean shift clustering method to label a new target with a new ID and verify the new target; and (c-4) target updating step assigning a unique ID to any new sample, adding one to the number of target, or when the number of sample for a target is lower than a preset threshold, removing the target and subtracting 1 from the number of target.

To achieve the foregoing aspect, the present invention provides a system of multi-target detecting and tracking with multiple cameras, including: a detection analyzing mechanism analyzing a plurality of camera views with a target detection algorithm in generating a plurality of analysis data; a Bayesian framework integrating the analysis data to form a TDP distribution so as to detect any newly appearing target and provide temporal information in the time domain between successive frames; and a tracking mechanism providing an automatic detecting and tracking of a plurality of moving targets in the camera views and converting the detecting and tracking into a sample management process.

Preferably, the target detection algorithm is applied to a 2D background subtraction between any one of the camera views and a background thereof.

Preferably, the system is applicable to an IP camera, a digital recorder, a video surveillance system, an interface software between man and machine, a communication electronic device (e.g. 3G mobile phone), a traffic control system and a security system.

Preferably, the TDP distribution equals to a sum of a probability, $G_1(X)$, making a newly appearing target to be detected easily and a probability, $G_2(X)$, providing temporal information in the time domain between successive frames, and X is a location on a ground plane.

Preferably, the tracking mechanism includes a sample generating module executing a MCMC sampling corresponding to the probability $G_1(X)$ and generating a plurality of samples from the TDP distribution and executing a SMC sampling corresponding to the probability $G_2(X)$ to iteratively update and predict each respective location, weight and ID of the samples; a sample labeling module adopting a maximum likelihood decision rule to classify the samples; a new target identifying module grouping similar samples with a mean shift clustering method to label a new target with a new ID and verify the new target; and a target updating module assigning a unique ID to any new sample, adding one to the number of target, or when the number of samples for a target is lower than a preset threshold, removing the target and subtracting 1 from the number of target.

The foregoing and other features and advantages of the present invention will be more clearly understood through the following descriptions with reference to the drawing, wherein:

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee. The above and/or other features and advantages of the invention will become more apparent and more readily appreciated by describing in detail embodiments thereof with reference to the accompanying drawings in which:

FIGS. 4A-4D are schematic views illustrating the sample management process in accordance with the first example embodiment of the present invention;

FIG. 5 is a synthesized camera view of four cameras in accordance with a second example embodiment of the present invention;

DETAILED DESCRIPTION OF THE PREFERRED EMBODIMENT

To improve the drawbacks such as the corresponding error caused by the homography mapping, and the complicated target detecting and tracking in the image domain and manual selection of target to be detected in the prior art, the present invention provides a method and system of multi-target detecting and tracking over multiple cameras. In contrast to the prior art, the present invention can detect multiple targets that newly enter the camera view at any time by just performing relatively simple detection analysis of moving target in the 2D image domain until these targets leave the monitored views. It is to be noted that the following descriptions of example embodiments of this invention are presented herein for purpose of illustration and description only; it is not intended to be exhaustive or to be limited to the precise form disclosed.

The present invention will now be described more specifically with reference to the following embodiments.

First of all, a first example embodiment of the present invention discloses a method of multi-target detecting and tracking with multiple cameras, including the steps as follows:

(a) analyzing a plurality of 2D camera views with an object detection algorithm by using an object detection algorithm in generating corresponding plural 2D analysis data, i.e. foreground image; (b) using a Bayesian framework to integrate these 2D analysis data, the anterior knowledge of user-defined target locations that possibly appear, and the anterior knowledge of target locations predicted by the system in accordance with the past observation to formulate a target detection probability (TDP) distribution; the TDP distribution expresses the prediction of the likelihood of having a moving target at different ground location in accordance with a set of foreground images from multiple cameras and is a posterior distribution; and (c) automatically detecting and tracking a plurality of moving targets in the monitored views at the same time.

Figure 1A:
FIG. 1A is a view of binary foreground image illustrating a camera view in accordance with a first example embodiment of the present invention.

In the present invention a static camera is adopted and the geometric relationships between the cameras and the 3D space are calibrated beforehand. The object of the method of the present invention is to integrate the detection result from a set of 2D camera views to offer a global 3D view and perform automatic target detecting and tracking on the 3D view. Therefore, the analysis of a single 2D image performs no complicated operation and judgment but a preliminary filtering of image information for information integration. In the step (a), the 2D object detection algorithm could be a simple object detection algorithm (e.g. 2D background subtraction). For each camera, its reference background is built based on the Gaussian mixture model, in which the foreground image is generated by calculating the frame difference between the current image and the reference background in a pixel-wise manner. Annex 1 and FIG. 1A show a camera view and its binary foreground image respectively in accordance with a first example embodiment.

After completing the aforementioned 2D object detection analysis, the step (b) is used subsequently to integrate those 2D analysis data and form a posterior probability distribution named TDP. The TDP employs the Bayes rule to estimate its distribution and predicts the likelihood of having a moving target at a ground location given a set of foreground images from multiple cameras. The Bayes rule is expressed as follows:

$$p(X|F_1,\ldots,F_N) \propto p(X)p(F_1,\ldots,F_N|X) \quad (1)$$

Wherein X represents a location $(x_1, x_2)$ on the ground plane, N is the number of static cameras in the multi-camera system, and $F_i$ denotes the foreground image acquired from the ith camera view detected through 2D analysis.

Assume that (m, n) denotes the coordinates of a pixel on the foreground image, and the foreground image $F_i$ can be expressed as follows:

$$F_i(m, n) = \begin{cases} 1, & \text{if } (m, n) \in \text{foreground regions} \\ 0, & \text{if } (m, n) \notin \text{foreground regions} \end{cases} \quad (2)$$

Moreover, given the location X on the ground plane, assume that the foreground images from different camera views are conditionally independent of each other, that is, Eqn (1) can also be expressed as:

$$p(X)p(F_1, \ldots, F_N | X) = p(X) \prod_{i=1}^{N} p(F_i | X) \quad (3)$$

Figure 1B:
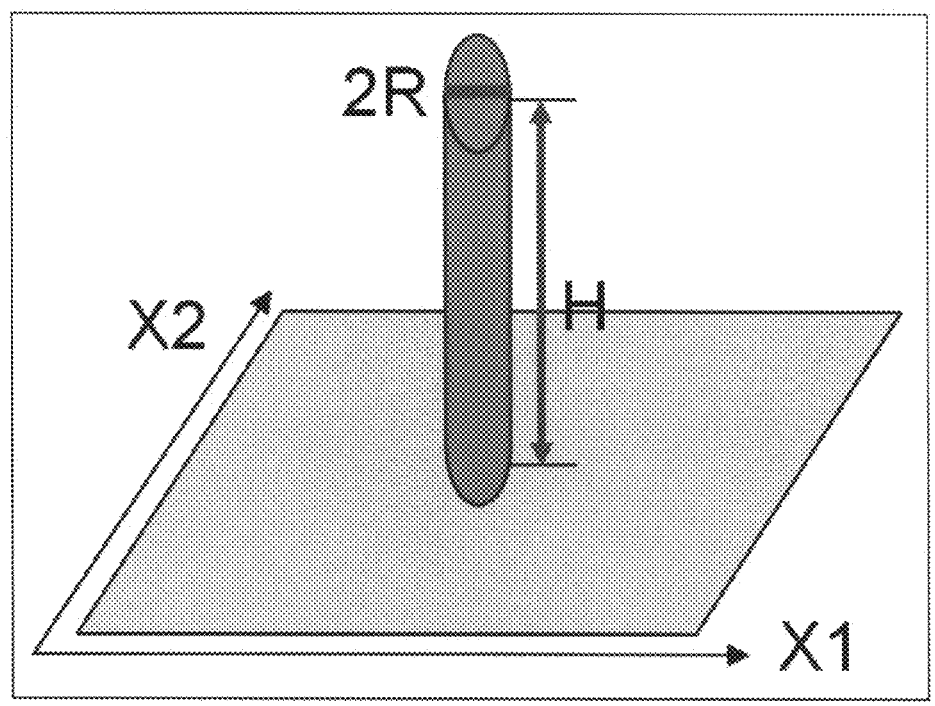
FIG. 1B is a schematic view illustrating a cylinder with a height H and a radius R on the ground plane in accordance with the first example embodiment of the present invention.
Figure 1C:
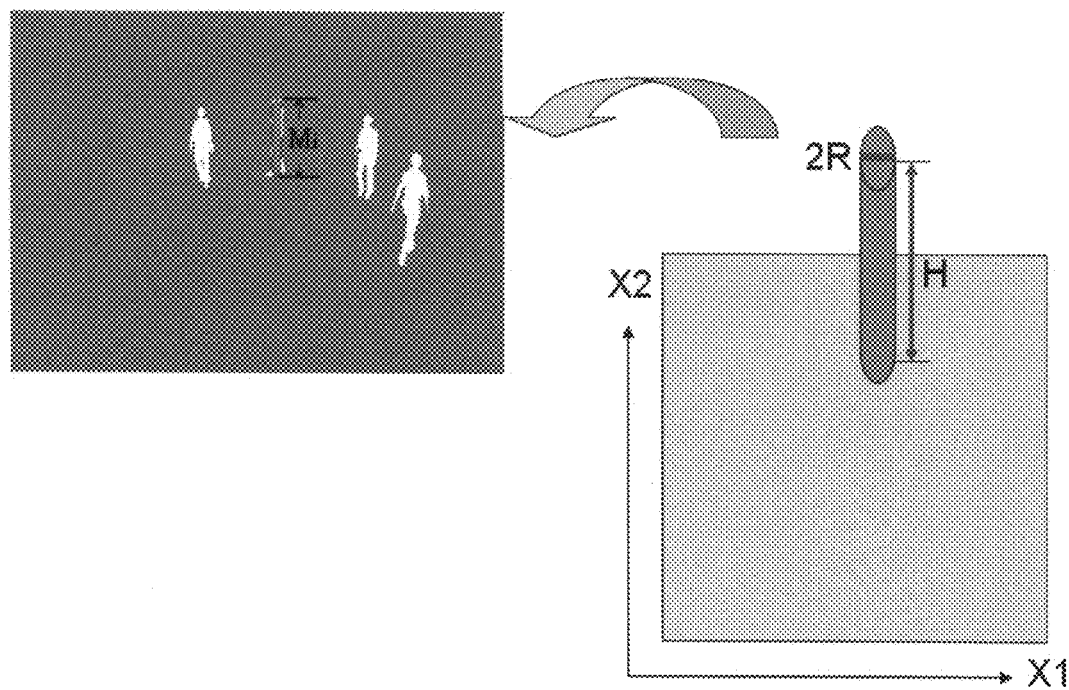
FIG. 1C is a schematic view illustrating the projection M of the cylinder in FIG. 1B in accordance with the first example embodiment of the present invention.

On the other hand, to simplify the formulation, a 3D moving target at the ground position X as a cylinder, with height H and radius R, as shown in FIG. 1B, is approximated. Based on the pre-calibrated projection matrix of the ith camera, the cylinder is projected onto the ith camera view to get the projected image $M_i$, as shown in FIG. 1C. Mathematically, it can be expressed as:

$$M_i(m,n) = \begin{cases} 1, & \text{if } (m,n) \in \text{projected regions} \\ 0, & \text{if } (m,n) \notin \text{projected regions} \end{cases} \quad (4)$$

The overlapped region of $M_i$ and $F_i$ offers a reasonable estimate about $p(F_i|X)$ after being through a perception perspective projection, that is, if the projected region $M_i$ is greatly overlapped with the detection result $F_i$, it is very likely that there is a moving target standing on the ground location X. Hence, $p(F_i|X)$ is defined as:

$$p(F_i|X) = \iint F_i(m,n)M_i(m,n)dmdn / \iint M_i(m,n)dmdn \quad (5)$$

Moreover, p(X) in Eqn (1) indicates the prior belief of finding a moving target at X. In our system, two different prior probabilities, $p_1(X)$ and $p_2(X)$, are considered. The prior probability, $p_1(X)$, is first selected, and it represents the anterior knowledge of the likelihood having a user-defined target at the location X, which may vary from case to case. In the embodiment, an equal probability is assigned to each ground location inside the surveillance zone, that is:

$$P_1(X) = \begin{cases} \frac{1}{W}, & \text{if } X \in \text{surveillance zone} \\ 0, & \text{if } X \notin \text{surveillance zone} \end{cases} \quad (6)$$

Wherein W is the total area of the ground plane inside the surveillance zone. The surveillance zone is decided by the overlapped fields of view of all cameras. The second choice of prior function, $p_2(X)$, is defined as $p(X^t|F^{t-1})$, wherein $F^{t-1} = \{F_1^{t-1}, F_2^{t-1}, \ldots, F_N^{t-1}\}$. This prior function is the estimated probability of X at the current time based on the belief propagated from the previous observations. Essentially, this prior function considers the property of temporal continuity and can be formulated as follows via the Chapman-Kolmogorov equation.

$$p_2(X) = p(X^t|F^{t-1}) = \int p(X^t|X^{t-1})p(X^{t-1}|F^{t-1})dX^{t-1} \quad (7)$$

Note that in Eqn (7), $p(X^t|X^{t-1})$ is a motion prediction model and $p(X^{t-1}|F^{t-1})$ is the TDP distribution at time t−1.

Both $p_1(X)$ and $p_2(X)$ provide the anterior knowledge of target location, and their information is complementary. If $p_1(X)$ is solely selected, the probability of each ground location is identical to those of the prior information. As a result, Eqn (1) is mainly dominated by the likelihood function $p(F_1, F_2, \ldots, F_N|X)$. Due to the fact that the prior information of the targets detected on each ground location has the same probability, the likelihood of newly appearing target at any location is equally probable without lowering the ability of system in detecting new target. However, the temporal property between successive frames is not properly included by $p_1(X)$. On the other hand, $p_2(X)$ mainly focuses on the prior information accumulated by the temporal property of object propagated with time, and may cause poor performance in detecting new comers.

To compromise between these two choices, the present invention provides a hybrid prior probability and defines the TDP distribution as $$\begin{aligned} TDP &\equiv (p_1(X) + p_2(X))p(F_1, \ldots, F_N | X) \\ &= p_1(X)p(F_1, \ldots, F_N | X) + p_2(X)p(F_1, \ldots, F_N | X) \\ &\equiv G_1(X) + G_2(X) \end{aligned} \quad (8)$$

wherein $$G_1(X) \equiv p_1(X)p(F_1, \ldots, F_N | X)$$

$$G_2(X) \equiv p_2(X)p(F_1, \ldots, F_N | X).$$

Typically, the TDP distribution is composed of several clusters, each indicating a moving target on the ground plane. Hence, the detection of multiple moving targets can be treated as a clustering problem over the TDP distribution, while the constant tracking of these targets in the time domain can be thought as the temporal association of clusters at different instants.

Figure 2A:
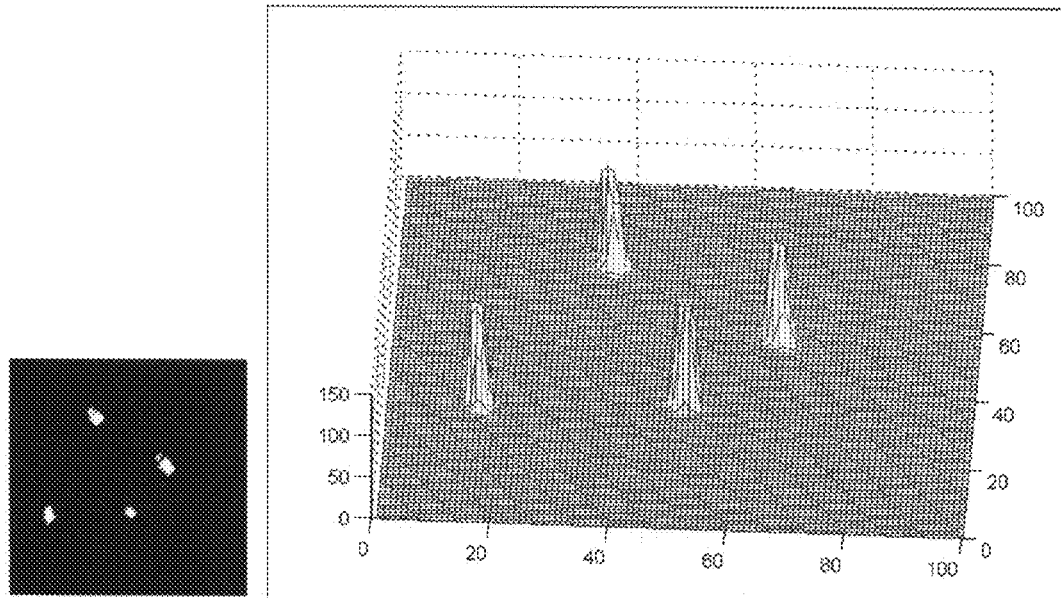
FIG. 2A is a bird's view illustrating a TDP distribution of four moving targets in the surveillance zone in accordance with the first example embodiment of the present invention.
Figure 2B:
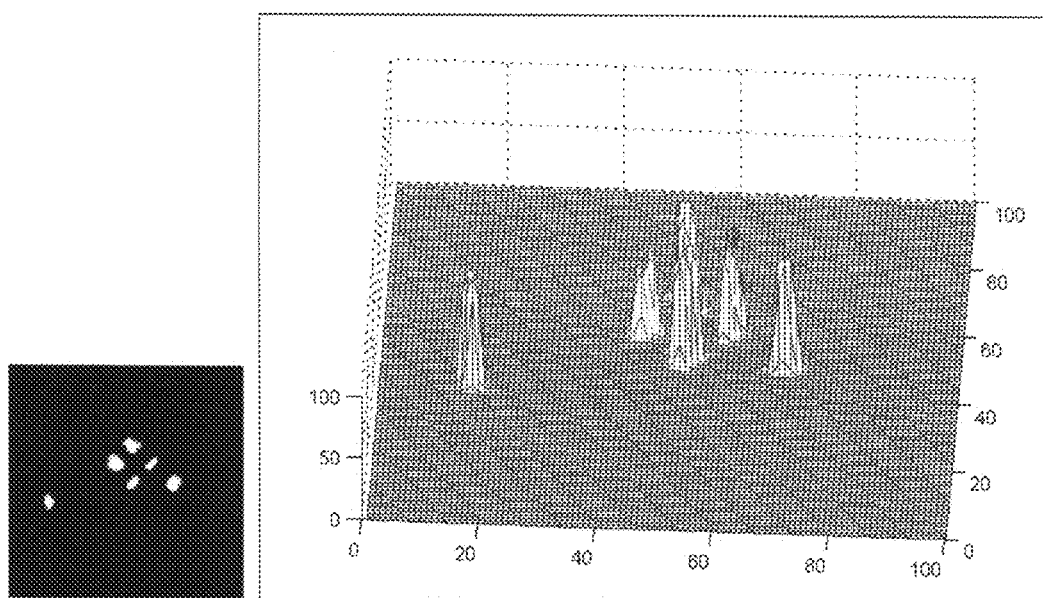
FIG. 2B is a bird's view illustrating a TDP distribution having four moving targets and two false clusters in the surveillance zone in accordance with the first example embodiment of the present invention.

Please refer to FIGS. 2A-2B which show the distribution at two instants in accordance with the TDP distribution in the first example embodiment of the present invention and its corresponding top views. Specifically, FIG. 2A shows the TDP distribution of four moving targets in the surveillance zone. The embodiment integrates the detection results of four cameras. Regarding how to apply the TDP distribution to the detecting and tracking of multiple targets, it will be explained later.

Occasionally, some fake clusters may also occur in the TDP distribution. This happens when the projection of a cylinder at an incorrect location accidentally matches the foreground masks on the camera views, while there is no target on the ground plane in reality.

Next referring to FIG. 2B which shows the TDP distribution having four moving targets with two fake clusters, the TDP distribution includes not only four real clusters but also two extra fake clusters. Fortunately, fake clusters can be effectively discriminated from true clusters by checking their temporal properties in the time domain. In general, a fake cluster either has some temporally unstable characteristics or has a short life cycle. These two properties enable to effectively get rid of fake targets.

Figure 3:
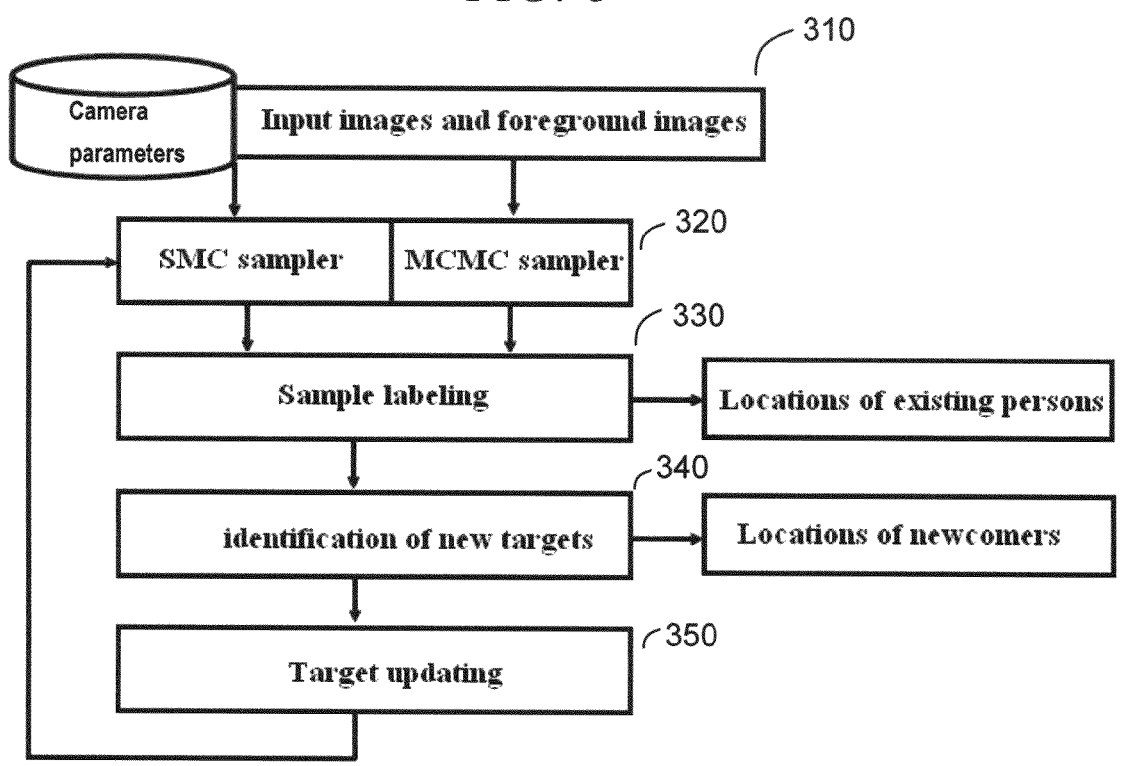
FIG. 3 is a flow chart illustrating a sample management process in accordance with the first example embodiment of the present invention.

In the aforementioned step (c), the detecting and tracking of multiple targets can be converted into a sample management process. FIG. 3 illustrates the block diagrams of the sample management process in accordance with the first example embodiment of the present invention. The sample management process includes four major steps upon receipt of images and foreground images 301, namely, sample generation step 320, sample labeling step 330, new target identifying step 340, and target updating step 350. Details of the above steps are respectively described as follows;

(c-1) sample generation step 320, shown in FIG. 3:

Since two different types of prior probabilities are considered, the generation of sample is implemented via two different mechanisms. The sample generation of $G_1(X)$ is implemented by the mixture Markov Chain Monte Carlo (MCMC)

method, while the sample generation of $G_2(X)$ is implemented by the Sequential Monte Carlo (SMC) method. The details of these two samplers (MCMC and SMC) will be explained as follows:

MCMC is a popular technique for sampling a probabilistic model. In the embodiments of the present invention, MCMC is used to generate numerous samples from the prior probability $G_1(X)$, which summarizes the 2-D detection results of multiple camera views. Since $G_1(X)$ usually contains narrow peaks, the commonly used Metropolis sampler is not an appropriate choice. Instead, a mixture hybrid kernel, which includes two Metropolis samplers with different proposal distributions represented by $N(\mu,\sigma_1^2)$ and $N(\mu,\sigma_2^2)$ respectively, is adopted. The greater standard deviation $\sigma_1$ is chosen to be great enough so that the sampler can allow the generation of sample points between peaks; while the smaller standard deviation $\sigma_2$ is chosen to generate sample points containing fine details within a single peak. The mixture weights are denoted as $V_1$ and $(1-V_1)$.

To draw K fair samples from $G_1(X)$, the process is detailed in the following Algorithm 1 and Algorithm 2. In addition, the ID of each sample is labeled as "undecided" in this step.

---
Algorithm 1: Mixture-MCMC sampler (MMS):
---

Assume that the distribution is $G_1(X)$, the proposal functions are $N(\mu,\sigma_1^2)$ and $N(\mu,\sigma_2^2)$, and the mixture weights are $V_1$ and $(1-V_1)$
(1) Randomly select the first sample $X^{(0)}$
(2) For I = 0 to K
    Generate a random value U from a uniform distribution over (0, 1)
      If U < $V_1$
        Get a sample $X^{(i+1)}$ by the Metropolis sampler based on $G_1(.)$, $N(X^{(i)}, \sigma_1^2)$, and $X^{(i)}$, that is, $X^{(i+1)} = MS(G_1(.), N(X^{(i)}, \sigma_1^2), X^{(i)})$
      else
        Get a sample $X^{(i+1)}$ by the Metropolis sampler based on $G_1(.)$, $N(X^{(i)}, \sigma_2^2)$, and $X^{(i)}$, that is, $X^{(i+1)} = MS(G_1(.), N(X^{(i)}, \sigma_2^2), X^{(i)})$
(3) Discard the first d samples.

---
Algorithm 2: Metropolis sampler (MS): The function is $MS(G(.), f(.), X)$
---

Randomly generate a candidate sample X* based on the probability density function f(.)
Randomly generate a sample W from the uniform distribution over [0, 1]
If W < $\{1, G(X^*)/G(X)\}$
    Then output = X*,
else
    output = X.

---

Sequential MC is a technique for representing a posterior distribution by a set of samples with different weights. To generate samples, this method usually chooses a proposal distribution which is relative to the previous posterior distribution. This mechanism makes SMC suitable for representing sequential distributions through recursive prediction and updating with time. A practical algorithm called sequential importance sampling (SIS), which is an extension from important sampling (IS) algorithm, is adopted in this system for implementing the SMC sampler.

Assume that a set of S samples $\{X^{(i),t-1}\}_{i=0\sim S-1}$ have been obtained based on the TDP, i.e. $p(X^{t-1}|F^{t-1})$, at the previous moment. These samples have equal weights $\{q^{(i)}\}_{i=0\sim S-1}$, that is, $q^{(i)}=1/S$, for $i=0\sim S-1$, while the distribution of the samples basically follows $p(X^{t-1}|F^{t-1})$. For each sample $X^{(i),t-1}$, assume that its motion model follows the uniform distribution, that is, assume $$p(X^{(i),t} | X^{(i),t-1}) = \begin{cases} \frac{1}{\pi R^2}, & \text{if } |X^{(i),t} - X^{(i),t-1}| < R \\ 0, & \text{else} \end{cases} \quad (9)$$

wherein R is a pre-defined radius. By randomly moving each sample based on this motion model, a new set of samples $\{X^{(i),t}\}_{i=0\sim S-1}$, which basically follow the temporal prior distribution $p_2(X) \equiv p(X^t|F^{t-1})$, are expressed in Eqn (7). Note that the new samples still have equal weights $\{q^{(i)}\}_{i=0\sim S-1}$ at this stage.

Then, apply a so-called "importance sampling" process over a new set of samples. In this process, for a sample $X^{(i),t}$, adjust its weight to $$w^{(i)} = q^{(i)} \cdot p(F_1, \ldots, F_N | X^{(i),t}) \quad (10)$$

Since $q^{(i)}$s are equal-weighted, $w^{(i)}$s are proportional to the likelihood function $p(F_1, \ldots, F_N | X^{(i),t})$. Hence, after random movement and importance sampling, a new set of unequal-weighted samples $\{X^{(i),t}\}_{i=0\sim s-1}$ have been obtained to carry the information about the $G_2(X)$ distribution. The $p(F_1, \ldots, F_N|X^t)$ part of $G_2(X)$ is represented by sample weights, while the p(X) part of $G_2(X)$ is represented by the sample distribution.

Finally, to avoid the degeneracy problem, the present invention further uses a re-sampling process to convert these unequal-weighted samples into a new set of equal-weighted samples. Samples with greater weights are converted to more equal-weighted samples, while samples with smaller weights are converted to fewer equal-weighted samples. After the re-sampling process, the sample weights become constant and the sample distribution carries the whole information about $G_2(X)$.

Moreover, these samples generated by the mixture-MCMC sampler are also assigned constant weights. By properly mixing the samples generated by the mixture-MCMC sampler with the samples generated by the SMC sampler, a set of equal-weighted samples are formed to carry the information about the TDP distribution $p(X^t|F_1, \ldots, F_N)$. The same procedure can thus be repeated again and the TDP distribution at the next instant based on these equal-weighted samples can be estimated.

(c-2) Sample labeling step:

An ID for each sample X is assigned. If at time t, the ID of the sample X is assigned to $H_k$, it means the target $H_k$ may have an opportunity to appear at the location X at that moment. In sample generating, samples generated by the mixture MCMC method are marked as "undecided" and their IDs are to be labeled. On the other hand, except a few samples, most samples generated by the SMC method will be marked as "decided" and their IDs inherit from their parent samples. In this sample labeling step, the major functionality thereof is to assign a suitable ID for each of these "undecided" samples. In this embodiment, a group of samples with the same ID represent a probability distribution of a target's location on the ground plane. At successive instants, those samples with the same ID reveal the traces of that target with time.

Assume that at the previous instant we have already identified M targets $\{H_1, H_2, H_3, \ldots, H_{M-1}\}$ on the ground plane inside the surveillance zone. If the ground plane is treated as the 2D feature space and the ground position X as a feature point, this ID assignment problem can be treated as a typical classification problem. Moreover, since there could be some newly appearing targets at the current moment, one extra target $H_M$ is added to handle these samples caused by the new comers.

To label these "undecided" samples, the likelihood function $p(X|H_k)$ for $k=0, 1, \ldots, M$ is firstly constructed. For $k=0, 1, \ldots, M$, the $p(X|H_k)$ is modeled as a Gaussian function. The method for determining the model parameters is discussed later. At time t, assume that there are R "decided" samples $\{X_{k,0}, X_{k,1}, \ldots, X_{k,R-1}\}$ with their IDs being labeled as $H_k$. To help in ID labeling, the "color weight" for each of these samples is defined. Assume that at the previous instant, the position of $H_k$ was estimated to be at $\mu^{k,t-1}$, that is, assume that the corresponding cylinder of $H_k$ is standing at $\mu^{k,t-1}$ at time t−1. By projecting that cylinder onto all N camera views, N projected regions are obtained. Based on the RGB values of these pixels inside these N projected regions, a color histogram for that target at t−1, denoted as $CH(b;\mu^{k,t-1})$, is generated, wherein b is the bin index of histogram. Similarly, for each sample $X_{k,j}$, another cylinder can be generated at $X_{k,j}$ and its color information based on its projections over all camera views is collected. This forms the second color histogram $CH(b; X_{k,j})$. By calculating the Bhattacharyya distance between $CH(b; \mu^{k,t-1})$ and $CH(b; X_{k,j})$, the color weight of the sample at $X_{k,j}$ is defined as follows:

$$CW(X_{k,j}) = \Sigma_b \sqrt{CH(b;\mu^{k,t-1})CH(b;X_{k,j})} \quad (11)$$

To maintain the robustness of tracking, the status of a "decided" sample will be switched back to "undecided" if its color weight is smaller than a pre-defined threshold and its ID will be re-labeled soon afterwards.

Based on these "decided" samples, the likelihood function $p(X|H_k)$ for each target $H_k$ can be estimated. As mentioned above, $p(X|H_k)$ is modeled as Gaussian function. For these samples $\{X_{k,0}, X_{k,1}, \ldots, X_{k,R-1}\}$ that belong to $H_k$, their color weights $CW(X_{k,j})$ are calculated. The mean vector and covariance matrix of $p(X|H_k)$ are then estimated based on these color weights $$\mu^{k,t} = \frac{\sum_{j=0}^{R-1} CW(X_{k,j}) X_{k,j}}{\sum_{j=0}^{R-1} CW(X_{k,j})} \quad (12)$$

$$C^{k,t} = \frac{\sum_{j=0}^{R-1} CW(X_{k,j})(X_{k,j} - \mu^{k,t})(X_{k,j} - \mu^{k,t})^T}{\sum_{j=0}^{R-1} CW(X_{k,j})} \quad (13)$$

Wherein the mean vector $\mu^{k,j}$ represents the best estimate of the location of $H_k$. Hence, assume that the ground location of $H_k$ is at $\mu^{k,j}$.

On the other hand, for an additionally added target classification $H_M$, its likelihood function is defined as follows:

$$p(X|H_M) = \begin{cases} \frac{1}{w}, & \text{if } X \in \text{surveillance zones} \\ 0, & \text{if } X \notin \text{surveillance zones} \end{cases} \quad (14)$$

The likelihood function implies that a new corner may uniformly appear at any location within the surveillance zone.

Based on the maximum likelihood decision rule, an "undecided" sample X is then classified as $H_k$ if $$p(X|H_k) > p(X|H_j), \text{ wherein } j=0,1,\ldots,M \text{ but } j \neq k \quad (15)$$

Note that if a sample is classified as $H_M$, that sample belongs to a new corner.

(c-3) New target identifying step 340, shown in FIG. 3:

For those samples that are assigned to $H_M$, they are further clustered based on the mean-shift clustering technique. This mean-shift clustering method is efficient and robust and doesn't require the anterior knowledge about the number of new targets. Assume that a set of samples $\{X_{M,0}, X_{M,1}, \ldots, X_{M,U-1}\}$ have been assigned to $H_M$. By an method iteratively calculating location movement, the next position $y_{j+1}$ based on the previous position $y_j$ is calculated as expressed below:

$$y_{j+1} = \frac{\sum_{i=0}^{U-1} X_{M,i} \exp\left(\left\|\frac{y_j - X_{M,i}}{h}\right\|^2\right)}{\sum_{i=0}^{U-1} \exp\left(\left\|\frac{y_j - X_{M,i}}{h}\right\|^2\right)} \quad (16)$$

wherein h is a parameter controlling the kernel size.

(c-4) Target updating step 350, shown in FIG. 3:

Since there could be some new comers and some departing people, the number of targets in this step needs to be updated. For a new target, a unique ID is assigned thereto and 1 is added to the number of targets. In contrast, as a target leaves the scene, the samples assigned to that target will become fewer and fewer. When the number of samples is lower than a pre-defined threshold, that target is regarded as "absent" and 1 is subtracted from the number of targets. All the samples assigned to that target will also be removed.

Figure 4B:
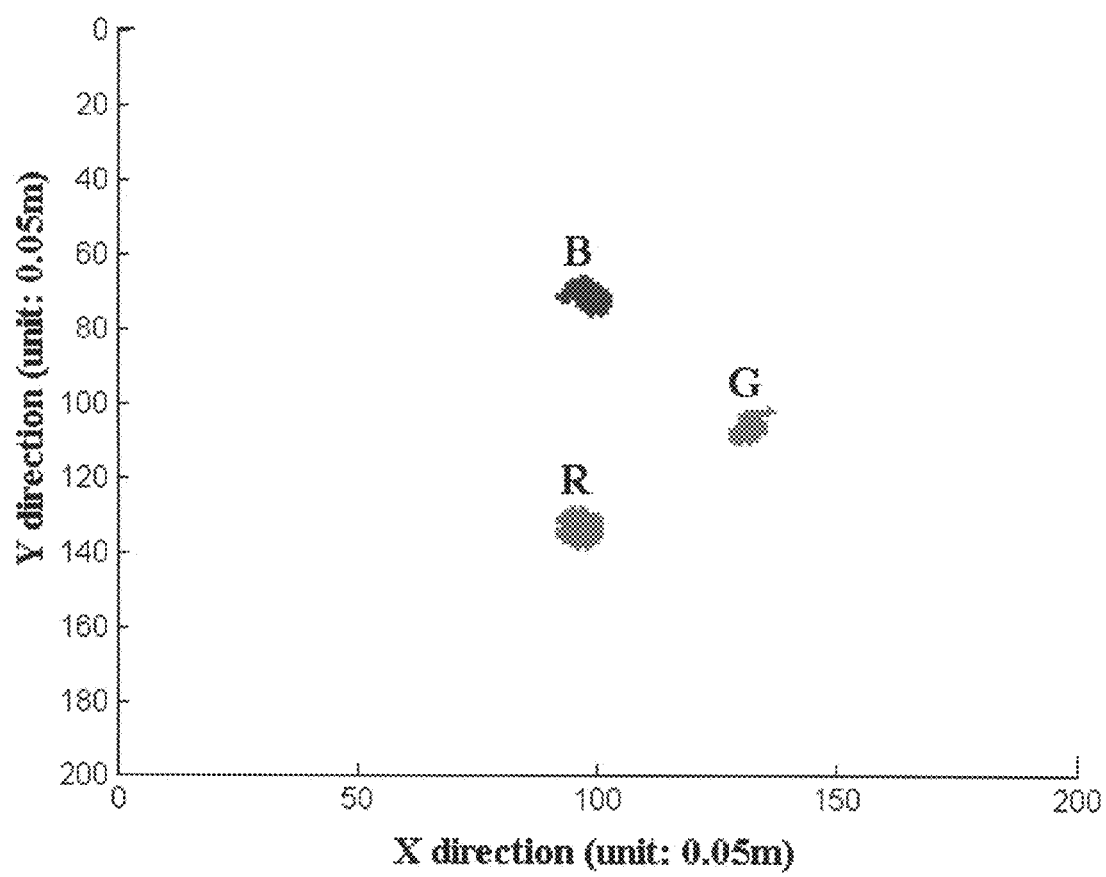
Figure 4C:
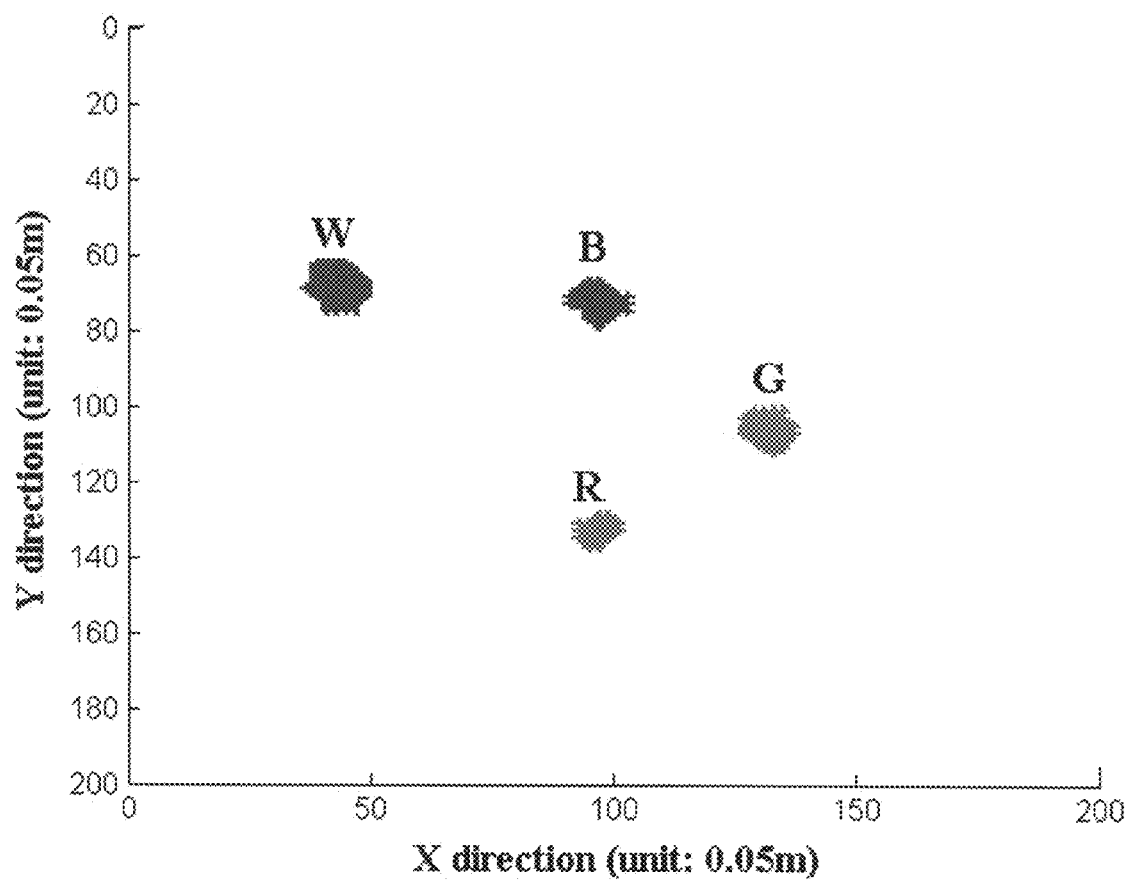
Figure 4D:
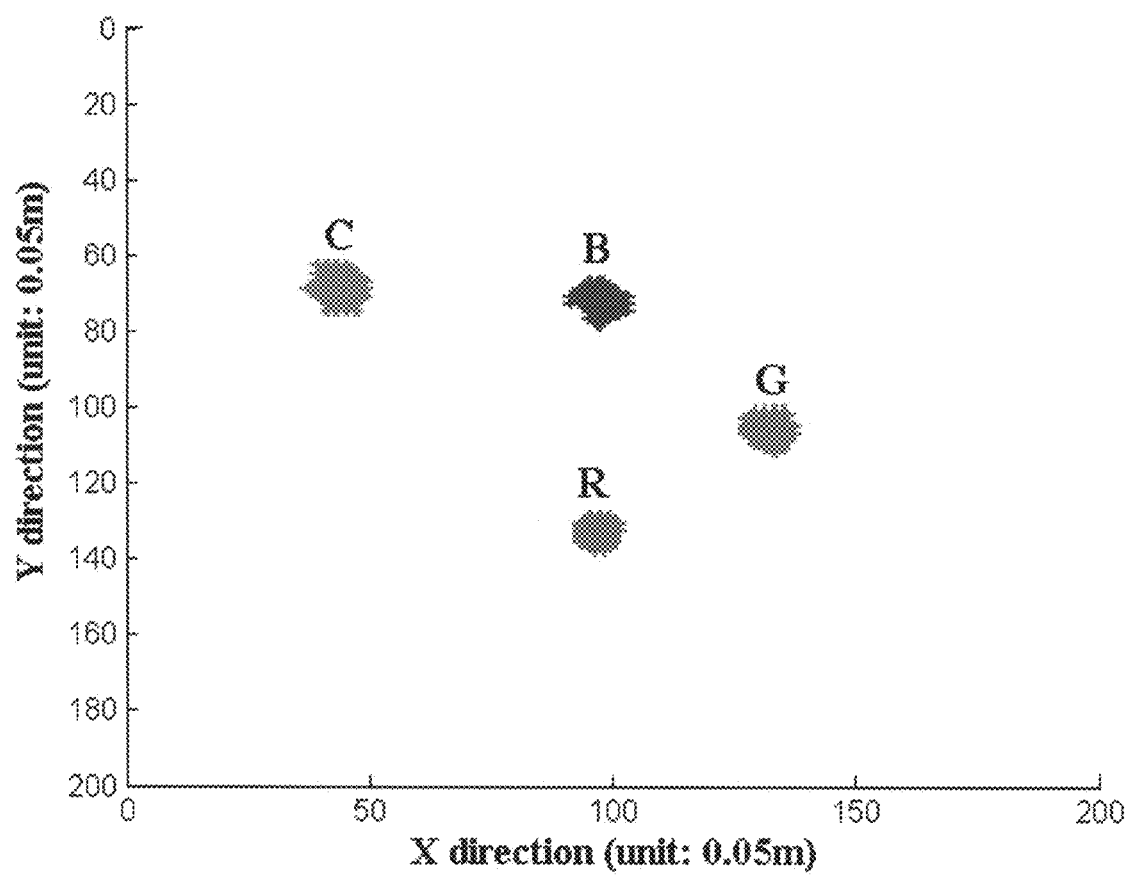

FIG. 4A to 4D illustrate the undecided samples of an example for the method in accordance with the first example embodiment of the present invention (by means of marking, W (white) representing the "undecided" samples in the field of view, and R (red), G (green), B (blue) and C (cyan) representing the samples in the surveillance zone). In this example, there were three persons at the previous instant (marked by R, G and B) and a person newly entering the scene at the current moment (marked by C). In FIG. 4A, the "undecided" samples generated by the mixture-MCMC sampler and the possible locations of samples successfully generated around all these four targets are shown. In FIG. 4B, the samples generated by the SMC sampler are shown. Samples of the same color (i.e. identical marking) are assigned to the same target. As expected, the samples generated by the SMC sampler neglect the generation of new target. In FIGS. 4C and 4D, the results after sample labeling and the final result after target updating are shown respectively. The newly appearing target has been successfully detected and is colored in cyan (marked by C). The other three targets are also successfully tracked.

In addition to the aforementioned method of multi-target detecting and tracking with multiple cameras, the present invention further provides a second example embodiment, which is a system of multi-target detecting and tracking over multiple cameras. The concepts and description employed by the system stem from what was mentioned above, and thus the similar portion won't be repeated again.

The above system includes a detection analysis mechanism using a target detection algorithm to analyze a plurality of 2D camera views in generating a plurality of 2D analysis data; a Bayesian framework integrating those 2D analysis data, anterior knowledge for user to set up a possible location at which a target appears, and anterior knowledge for the system to predict a target location based on a past observation to form a TDP distribution, in which the TDP distribution expresses the prediction of the likelihood of having a moving target at different ground location in accordance with a set of foreground images from multiple cameras and is a posterior probability distribution; and a tracking mechanism providing an automatic detection and tracking mechanism of a plurality of moving targets in the surveillance zone and converting the detection and tracking into a sample management process.

As mentioned earlier, the target detection algorithm is a simple target detection algorithm (e.g. 2D background subtraction).

The TDP distribution is constituted by the sum of two probabilities, $G_1(X)$ and $G_2(X)$, in which X is a location on the ground plane, the probability $G_1(X)$ is a probability determined by the likelihood function of a target appearing at a location and the prior probability of a target location set up by user, and the probability $G_2(X)$ is a probability determined by the likelihood function of a target appearing at a location and the prior probability of a target location automatically learned and predicted by a time system in the past.

The tracking mechanism includes a sample generating module for executing the MCMC sampling corresponding to the $G_1(X)$, generating new samples from the $G_1(X)$, and executing the SMC sampling corresponding to $G_2(X)$ to iteratively update and predict new location, weight and ID of existing samples; a sample labeling module adopting a maximum likelihood decision rule to label new sample; a new target searching module adopting a mean shift clustering method to group similarly labeled samples so as to label ID on unlabeled samples and identify new target; and a target information updating module assigning a unique ID to a new target and adding 1 to the number of target or subtracting 1 from the number of target when the sample number of target is less than a preset threshold.

To understand if the method and system of the present invention are feasibly practical, both synthesized and real video sequences are used for test, in which the synthesized videos are generated by Object Video Virtual Video (OVVV), which is a publicly available visual surveillance simulation test bed. By using the OVVV, various kinds of scenario and camera setups can be easily designed. The ground truth of the moving targets for performance evaluation can also be obtained.

Please refer to FIG. 5 which illustrates a synthesized camera view of four cameras. In the example shown in FIG. 5, a virtual scene is 10.78 m long and 8.82 m wide. Around the scene, four virtual static cameras are set up. In this embodiment, the robustness of our system in tracking varying number of people is tested. In the Annex 2, three frames captured by these virtual cameras are shown; in the FIG. 5, the bird's eye view of the detection result is shown. Different markings (W for white, R for red, G for green, B for blue and C for cyan) correspond to different targets, circles indicate the current target location, and tails indicate the traces of these targets in the previous moment. It can be seen that this system can robustly detect and track multiple targets.

To objectively evaluate the performance of this system, the estimated locations of all individuals are compared with the ground truth provided by OVVV over 600 successive frames. As shown in Table 1, the maximum, minimum, and mean estimation errors have been calculated over two different sequences to measure the tracking accuracy of this system.

TABLE 1

|  | Maximum error | Minimum error | Mean error |
| --- | --- | --- | --- |
| Sequence 1 | 0.287 m | 0.001 m | 0.068 m |
| Sequence 2 | 0.362 m | 0.001 m | 0.008 m |

Figure 6:
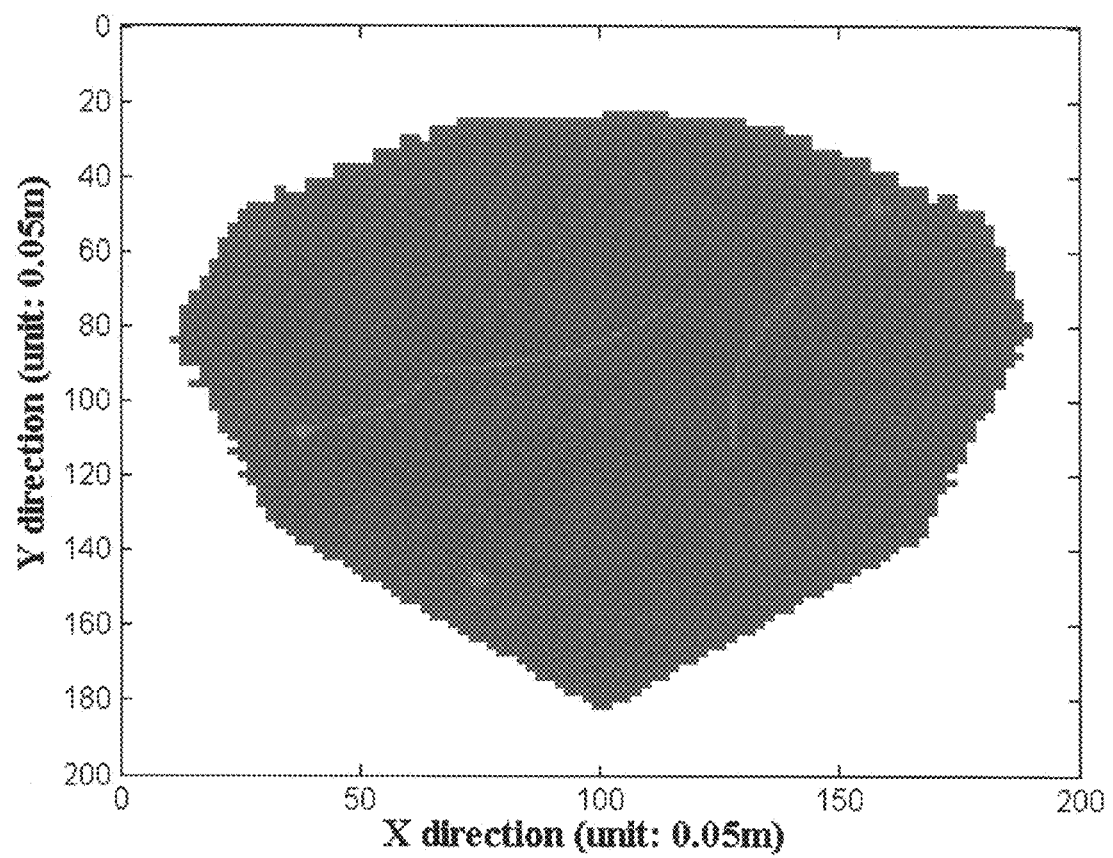
FIG. 6 is a real camera view of four cameras in accordance with the second example embodiment of the present invention.
Figure 7:
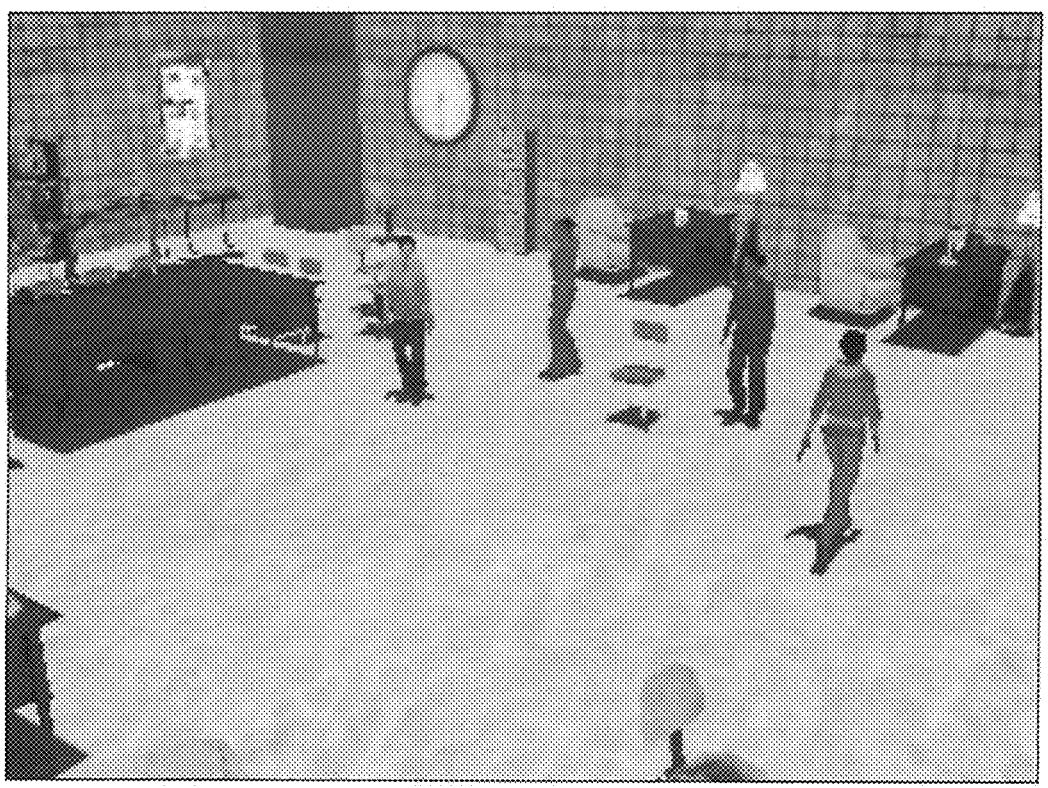
FIG. 7 shows an example camera view and its binary foreground image illustrated in FIG. 1A.
Figure 8:
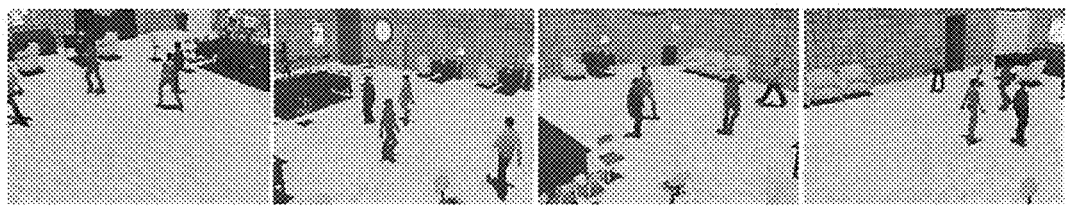
FIG. 8 shows consecutive frames captured by virtual cameras.
Figure 9:
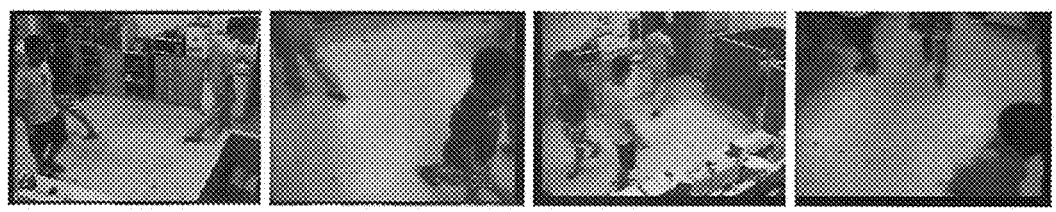
FIG. 9 shows captured images from cameras.
Figure 10:
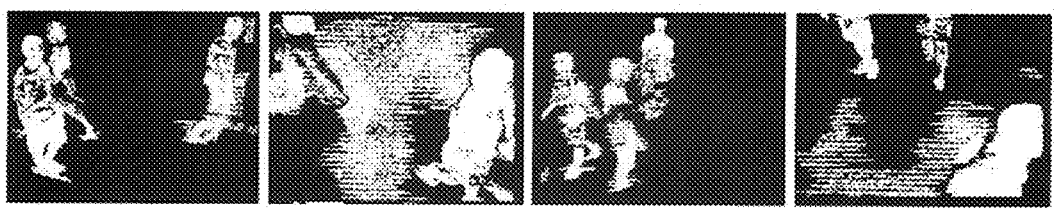
FIG. 10 shows example 2D detection result obtained in accordance with the present invention.

Besides, the present invention also sets up four static cameras (the present invention is not limited to this number) in the lab to capture real videos for testing. Please refer to Annexes 3~4, which show the real camera views from four cameras, in which Annex 3 shows the captured images, and Annex 4 shows 2D the detection result. Despite the instability of various 2D object detection results, it can be seen that the reliable tracking result, as shown in FIG. 6, can still be obtained in accordance with the system of the present invention.

The method and system provided by the present invention can be extensively applied to different fields, such as an IP camera, a digital recorder, a video surveillance system, an interface software between man and machine, a communication electronic device (e.g. 3G mobile phone), a traffic control system and a security system.

In summary, the present invention truly provides a method and system of multi-target detecting and tracking over multiple targets, which only requires simple 2D image analysis, provides stable multi-camera information integration technique, simultaneously accomplishes detecting and tracking of multiple moving targets, owns an operating speed meeting the requirement of practical application system, and secures correctness of stable tracking. As such, this invention provides the practical value to the industry and effectively overcomes the shortcomings of the prior art, and the application is hereby submitted in accordance with the patent laws.

While this invention has been described in terms of what is presently considered to be the most practical and example embodiments, it is to be understood that this invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method of detecting and tracking multiple targets within a surveillance zone with multiple cameras, comprising the steps of:
   (a) analyzing a detection result of a plurality of camera views using a target detection algorithm to generate a plurality of analysis data;
   (b) integrating the analysis data with a Baysian framework to create a target detection probability (TDP) distribution; and
   (c) simultaneously and automatically detecting and tracking a plurality of moving targets in the camera views within the surveillance zone,
   wherein the surveillance zone is determined by overlapping fields of view of all of the multiple cameras, and
   wherein the TDP distribution in the step (b) equals to a sum of a probability, $G_1(X)$, making a newly appearing target to be detected easily and a probability, $G_2(X)$, providing temporal information in the time domain between successive frames, and X is a location on a ground plane.

2. The method as claimed in claim 1, wherein the camera views are 2D camera views and the analysis data are 2D analysis data.

3. The method as claimed in claim 1, wherein the TDP distribution is a posterior probability distribution representing a likelihood of a presence of each moving target at a ground location in accordance with a set of foreground images from a plurality of cameras.

4. The method as claimed in claim 1, wherein the target detection algorithm in the step (a) is applied to a 2D background subtraction between any one of the camera views and a background thereof.

5. The method as claimed in claim 1, wherein the step (c) is a sample management process, further comprising:
- (c-1) a sample generating step of executing a MCMC sampling corresponding to the probability $G_1(X)$ and generating a plurality of samples from the TDP distribution, and executing a SMC sampling corresponding to the probability $G_2(X)$ to iteratively update and predict each respective location, weight and ID of the samples;
- (c-2) a sample labeling step of adopting a maximum likelihood decision rule to classify the samples;
- (c-3) a new target identifying step of grouping similar samples with a mean shift clustering method to label a new target with a new ID and verify the new target; and
- (c-4) a target updating step of assigning a unique ID to each new sample, adding 1 to the number of the targets, or when the number of the samples for targets is lower than a preset threshold, removing the target and subtracting 1 from the number of the targets.

* * * * *